United States Patent [19]

Reasoner, Jr. et al.

[11] Patent Number: 5,768,446
[45] Date of Patent: Jun. 16, 1998

[54] DOCUMENT PROCESSING

[75] Inventors: George E. Reasoner, Jr., Tecumseh; Daniel R. Edwards, Ypsilanti; Gerald R. Smith, Farmington; Debora Y. Grosse; Robert C. Kidd, both of Ann Arbor, all of Mich.

[73] Assignee: Unisys Corp., Blue Bell, Pa.

[21] Appl. No.: 314,737

[22] Filed: Sep. 29, 1994

[51] Int. Cl.[6] .................. G06K 9/54; G06K 9/60
[52] U.S. Cl. .................. 382/304; 382/234; 382/305
[58] Field of Search ............... 382/137, 234, 382/250, 246, 302–305, 285; 358/432, 433

[56] References Cited

U.S. PATENT DOCUMENTS

| | | | |
|---|---|---|---|
| 4,758,980 | 7/1988 | Tsunekawa et al. | 382/234 |
| 4,860,375 | 8/1989 | McCubbrey et al. | 382/303 |
| 4,888,812 | 12/1989 | Dinan et al. | 382/305 |
| 5,020,122 | 5/1991 | Walsh et al. | 382/305 |
| 5,033,106 | 7/1991 | Kita | 382/305 |
| 5,339,368 | 8/1994 | Higgins-Cuthman et al. | 382/250 |
| 5,390,262 | 2/1995 | Pope | 382/234 |
| 5,420,941 | 5/1995 | Capo et al. | 382/302 |
| 5,513,279 | 4/1996 | Yoshinari et al. | 382/232 |
| 5,528,705 | 6/1996 | Reasoner, Jr. et al. | 358/261.1 |

*Primary Examiner*—Leo Boudreau
*Assistant Examiner*—Bhavesh Mehta
*Attorney, Agent, or Firm*—John McCormack; Mark Starr

[57] ABSTRACT

In a system for processing and imaging documents to develop a stream of digital, video bit sets, each related to a different document is a passing array, this system including an arrangement for simultaneously compressing a number of said bit-sets for different document images and sending the results to output, this arrangement as comprising:

a preprocessing stage for distributing each said bit set in a pair, of like parallel bit-compression paths, one, a Master path for half the bits in a set, the other a Slave path for the other half as controlled by The Master, with both input to a common buffer, each compression path being adapted to execute a first compression and then a conditional second compression when certain initial factors are indicated and to provide a real-time-compressed output to this buffer; and both said compressions being performed on a single, two pass stage of a Histogram/Compressor printed circuit board.

3 Claims, 9 Drawing Sheets

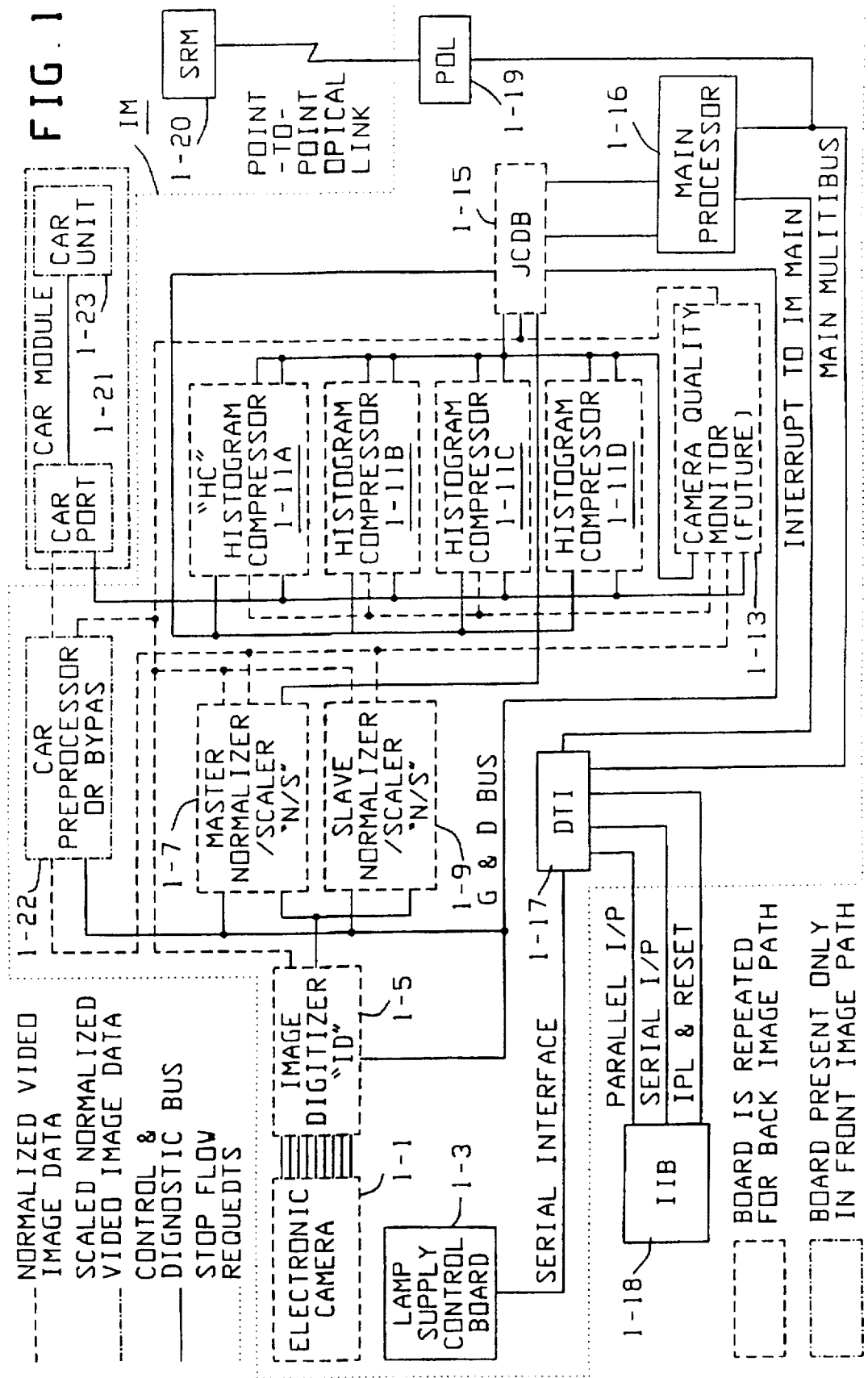

DOCUMENT PROCESSING

RELATED APPLICATION

A related application, U.S. Ser. No. 123,531, was filed Sep. 17, 1993 issued as U.S. Pat. No. 5,420,941 on May 30, 1996, by inventors in common herewith; it was a Continuation of Ser. No. 931,654, filed Aug. 17, 1992 and now abandoned, which, in turn, was a Continuation of Ser. No. 419,528, filed Oct. 10, 1989 and now abandoned. The instant case is a Continuation-in-part of these applications and owned in common, and here claims priority therefrom under the U.S. Patent laws.

FIELD OF THE INVENTION

This invention relates to the processing of documents and, more particularly, to a method and apparatus for transformation thereof.

BACKGROUND OF THE INVENTION

Workers in the art of automatically processing documents realize that it is often important to extract data therefrom (e.g., as digital image bits) and create a stream of representational signals to be then processed and transformed. This is the object of the following.

At times such a stream of image bits should be preprocessed preparatory to compression thereof. A related object hereof is to preprocess such signals in aid of their better compression. A related object is to do so for imaging data which is presented in a multi-bit data stream, for compressing and reducing the bits, and sending the results to utilization means, preferably in an arrangement which comprises a preprocessing (buffer) stage for presenting the data stream in two parallel bit-streams, plus a compression stage providing two parallel like compression paths for the in/out streams via a prescribed first compression-processing and then via a prescribed second compression-processing to provide a prescribed time-compressed output to the utilization means. A related object is to execute such compression in "real time", and according to JPEG standards. Still another object is to execute such compression by more efficient, faster means.

BRIEF DESCRIPTION OF THE DRAWINGS

For a more complete understanding of the present invention and related advantages thereof, reference may be made to the following detailed description, taken in conjunction with the accompanying drawings in which:

FIG. 1A is a very general block diagram of part of a document sorter system, while

FIG. 2 is a diagrammatic representation of preprocessing/compression steps for sample item images with a module as in FIG. 1, while FIG. 3 is a like diagram of a related array; while FIG. 3 is a block diagram of a related array and FIG. 1C is a block diagram of a dual path Histogram/Compressor embodiment for use therein;

DETAILED DESCRIPTION

System Overview

Figure 1A:
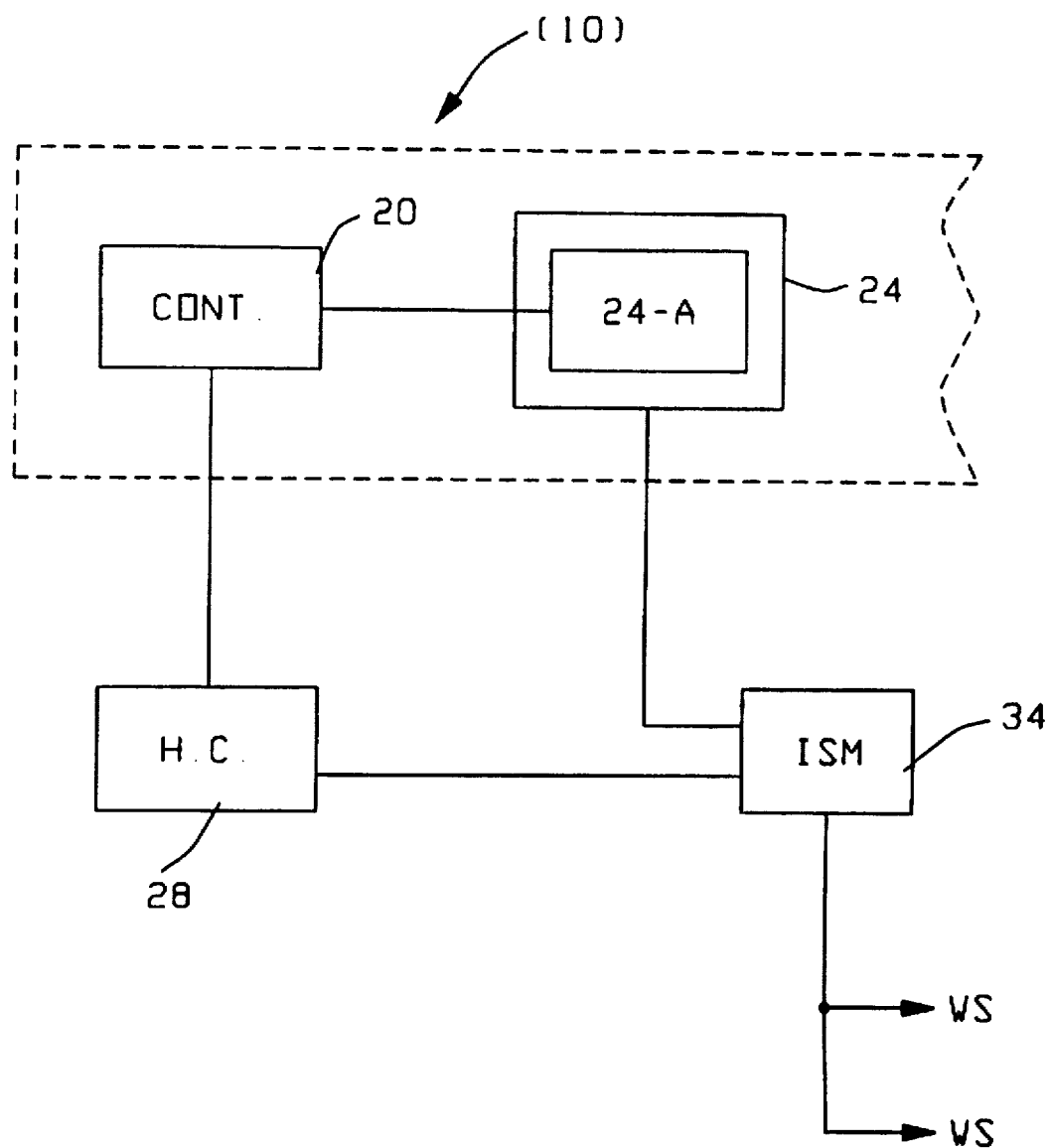

FIG. 1A will be understood to depict part of a Financial Item Sorting System 10 having a typical Item Sorter (e.g., in the preferred embodiment of this invention, a Model DP 1800 sorter which is manufactured by the Unisys Corporation of Blue Bell, Pa.).

Sorter 12 contains a Track for transport of checks or like Financial Items to be processed, e.g., by a typical reader and related controller. Additionally, the Sorter contains a Camera Assembly, and an Image Processor 24 apt for use in accordance with the teachings of the preferred embodiment of this invention.

Controller 20 is coupled to the Reader and to a Host Computer 28, as well as to Image Processor 24, as known in the art. An Image Storage Module 34 is also coupled to the Image Processor 24 and to a plurality of Workstations ws. The Camera Assembly is coupled to the Image Processor 24.

In operation, checks or like Items sequentially pass the Reader which can read a typical magnetic code thereon. The code read-out is then sent to Computer 28, for storage therein and to Image Processor 24. As each Item travels along the Track, it passes the Camera System which captures an image thereof and outputs a digital representation of the image to the Image Processor 24. This digital representation comprises a plurality of image pixels having an intensity which can be represented by an "intensity-number" between 0 and 255. Image Processor 24 then processes this digitized image and sends the associated signals to the Image Storage Module 34 for storage therein. After this, the documents are then sorted and stored in the usual way.

After a typical block of checks has been processed in this manner, an operator at one of the Workstations may request the aforementioned image bits from Storage Module 34. These bits are then downloaded to his Workstation along with their associated identifying magnetic code data obtained from Host Computer 28.

After these bit sets of (images) are captured by a Workstation, an operator may electronically enter associated data (e.g., check dollar-amount) with a given document-image and electronically resolve any difficulties; (e.g., an error in reading the magnetic code thereon) entering and storing the needed correction for the image. Each digitized image and its associated data and corrections then form a single corrected, completed electronic computerized record which can then be sent to Storage Module 34. Thereafter, it may be accessed for use in automatically inscribing associated data (e.g., dollar amount, corrections) upon the stored Items. In this way, item Sorting System 10 substantially eliminates the manual handling of Items 16 when an associated dollar amount is placed thereon, thereby increasing the efficiency and timeliness of sorting and processing.

Compression Stages

Within Image Processor 24 is placed one of "n" JPEG processing/compression Stages according to a feature hereof. Two of these JPEG processing/compression paths are preferably implemented on a Histogram/Compression printed circuit board assembly (PCBA) as shown in FIG. 1C.

Image Processor 24 of FIG. 1A is preferably characterized by the following: an Image Digitizer Unit (D of FIG. 2) for analog to digital conversion of the captured image, a Normalizer/Scaler (N/S Unit FIG. 2) for normalization and scaling of the video image, a set of "n", parallel JPEG Processing/Compression Units (J1 etc. of FIG. 2 and 24-A of FIG. 1A) for image processing/JPEG compression and a JPEG Compressed Data Buffer Unit (JCDB in FIG. 2) for collection and temporary storage of compressed images from the JPEG Processing/Compression Units. [Note "JPEG" refers to the compression standard by the "Joint Photographic Experts Group".]

These functions are implemented especially to meet the performance requirements of a high speed check process (imaging) system and to minimize the cost of the system by reducing the amount of "parallel hardware" needed to compress images. A preferred "dual" Processing/Compression Stage (for JPEG) is indicated in FIG. 1C.

The JPEG compression hardware performs image processing on a 128 grey level, scaled image before executing a two-pass JPEG compression. Scaling is nominally at 137.5 dpi but can range from 137.5 dpi to 50 dpi in steps of 12.5 dpi. This two-pass compression is designed—according to this feature—to reduce images to a predictable "packet size" apt for use in the entire High-Speed Check Imaging System. These functions of the JPEG "P/C" (Processing/Compression) hardware, (detailed below) must be performed, here, in real time on check images as they move down a high-speed Check Sorter Track at an approximate rate of 1800 checks per minute.

It is not possible, within the environment of the high-speed Check Imaging System (detailed below), for a single JPEG "P/C" (Processing/Compression) path to process every check in real time. Therefore, multiple JPEG "P/C" paths, operating in parallel, are needed (e.g., see FIG. 1-C). To reduce the time required for each processing/compression path to operate on an image (and therefore reduce the number of parallel paths needed to maintain system performance), many of the required functions of the JPEG "P/C" path have been implemented in hardware. The detailed explanation of each of these functions is described below.

System Environment

A JPEG "P/C" (Process/Compression) path as here contemplated, will perform image processing and real time JPEG compression of normalized and scaled images of documents (e.g. checks) captured in a Check Sorter at an average rate of 1800 checks per minute. The diagram in FIG. 2 indicates conditions under which each JPEG "P/C" path preferably operates and the performance required of such a unit to maintain overall system performance.

Figure 2:
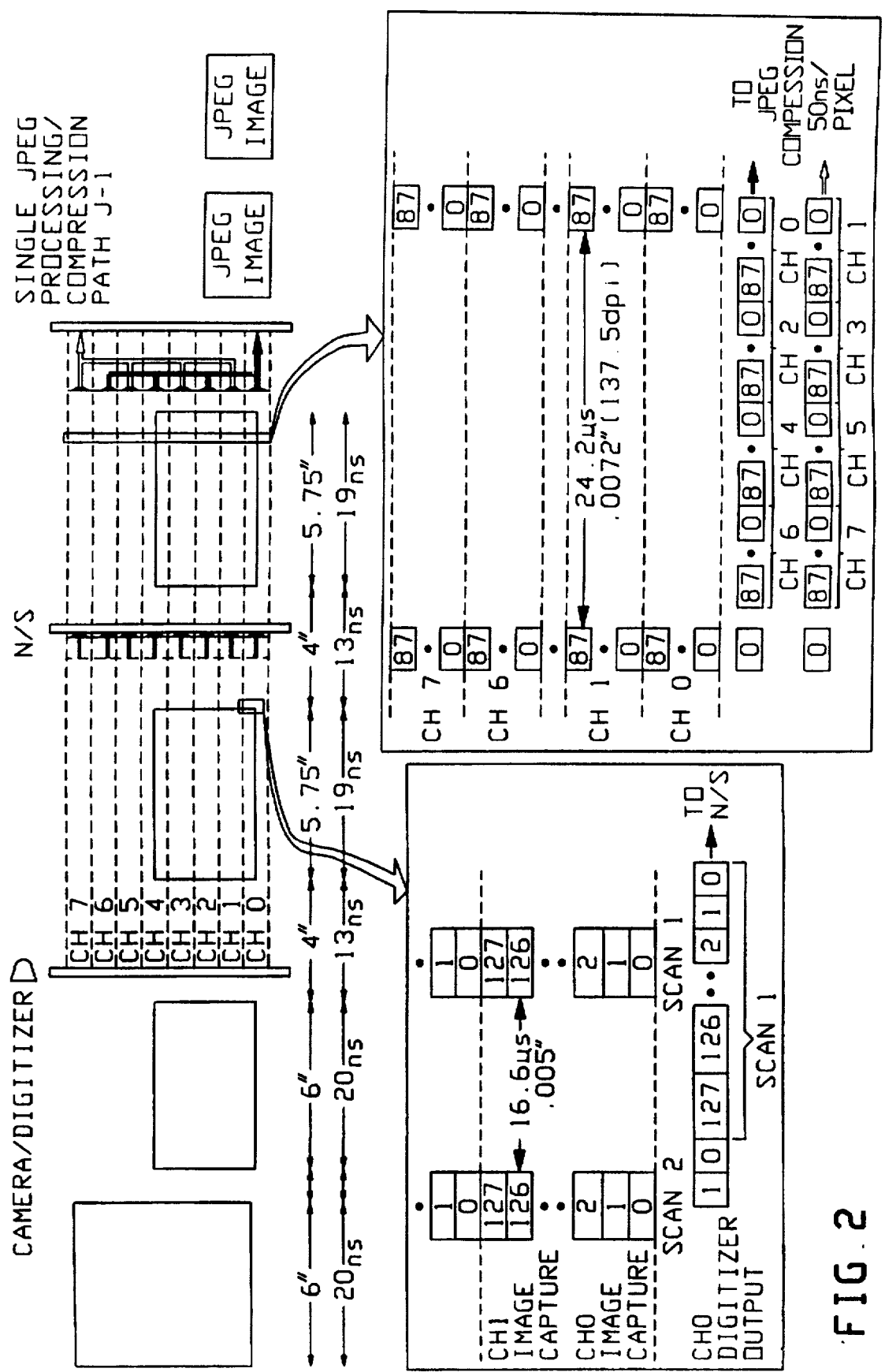

FIG. 2 shows the processing of a sample of check images as they move left to right across the page, simulating the way a check would move through a Check Sorter. (Here, track speed of sorter assumed to be 300 inches per second; this means that a check 6 inches long will take 20 ms to pass a fixed point on the Sorter Track.) Here, checks can range in length from 5.75 inches to 9 inches (19 ms to 30 ms), with inter-checks-gaps ranging from 1.5 inches (5 ms) to several inches.

The check images are captured by camera means, here preferably comprised of a vertical, 1024-element CCD array which samples 256 grey levels per pixel (8 bits) with a resolution of 200 pixels per inch. In the vertical direction, the Camera can capture images up to 5.12 inches high. The 1024 element array takes a snapshot of the check every 16.66 us as it moves down the Sorter Track, yielding a horizontal capture resolution of 200 pixels per inch. These 1024 pixel scans (captured every 16.66 us by the CCD array) are divided into eight 128 pixel Channels (shown as CH 0 through CH 7 in FIG. 2, each composed of 128 pixel scans). Hardware in the Digitizer D converts each 128 pixel scan into eight serial streams of pixels, with one pixel being output approximately every 130 ns.

The N/S (Normalizer/Scaler) hardware next normalizes the pixel values from the 1024 CCD elements and then scales the image down. The maximum resolution after scaling is 137.5 ($^{11}/_{16}$ths scaling of 200 dpi captured image) pixels per inch in both dimensions (e.g., see example shown in FIG. 2). In this example the 128 pixel scans in each Channel are reduced to 88 pixels per scan. The N/S hardware "time-multiplexes" four channels' worth of data onto two, 8-bit serial outputs to the JPEG "P/C" hardware. The 88 pixels from all four "even numbered" (total of 352 pixels per scan at 137.5 dpi) Channels (0, 2, 4, 6) are time-multiplexed along one serial stream, while the pixels from the four "odd" Channels (1, 3, 5 and 7) are multiplexed along a second serial stream. The two serial pixel streams operate at 50 ns/pixel (20 MHz) to guarantee that all 352 pixels per scan on each serial path can be transferred to the JPEG "P/C" hardware before the next scan is transferred.

A pair of JPEG "P/C" paths are preferably implemented on an H/C PCB (Histogram/Compressor Printed Circuit Board, as indicated in FIG. 1C). This H/C PCB must detect the image dimensions and perform image processing on the scaled image prior to compression. Selected image processing algorithms require a grey level histogram of the entire image prior to execution. This means the entire image must be buffered (e.g., at 3-1, FIG. 3) and a histogram generated (e.g., at 3-7) before image processing can begin. Once image processing is complete, compression can begin.

The performance of the entire image system is what dictates how the JPEG Processing/Compression hardware will reduce each image to a target packet size; this is why the here-detailed JPEG Compression hardware embodiment executes a 2-pass compression. The first pass uses a "standard" QM (Quantization Matrix) for JPEG compression. The results of the first pass compression, as well as the detected image dimensions, are used to pick a second QM for a second, final compression that will reduce the scaled image to the desired compressed packet size.

To maintain system performance, the JPEG Processing/Compression hardware must perform all these functions in real time which equates to generating a JPEG compression packet in 20 ms for a 6-inch check. Because a single JPEG "P/C" path cannot meet these requirements, multiple paths operating in parallel are required. The described H/C PCB was equipped with two independent JPEG "P/C" paths for this purpose (see FIGS. 3, 1C; preferably, the system has locations for up to 4 H/C PCBs, for Front/Rear imaging, this means the system can have as many as 8 JPEG compression paths operating in parallel; e.g., two for each H/C PCB—i.e., a pair on each side). For example, FIG. 4 indicates how two JPEG processing/compression paths are implemented on one H/C PCBA and how up to 4 H/Cs can be used on each side (front and back) of the imaging system.

Figure 1:
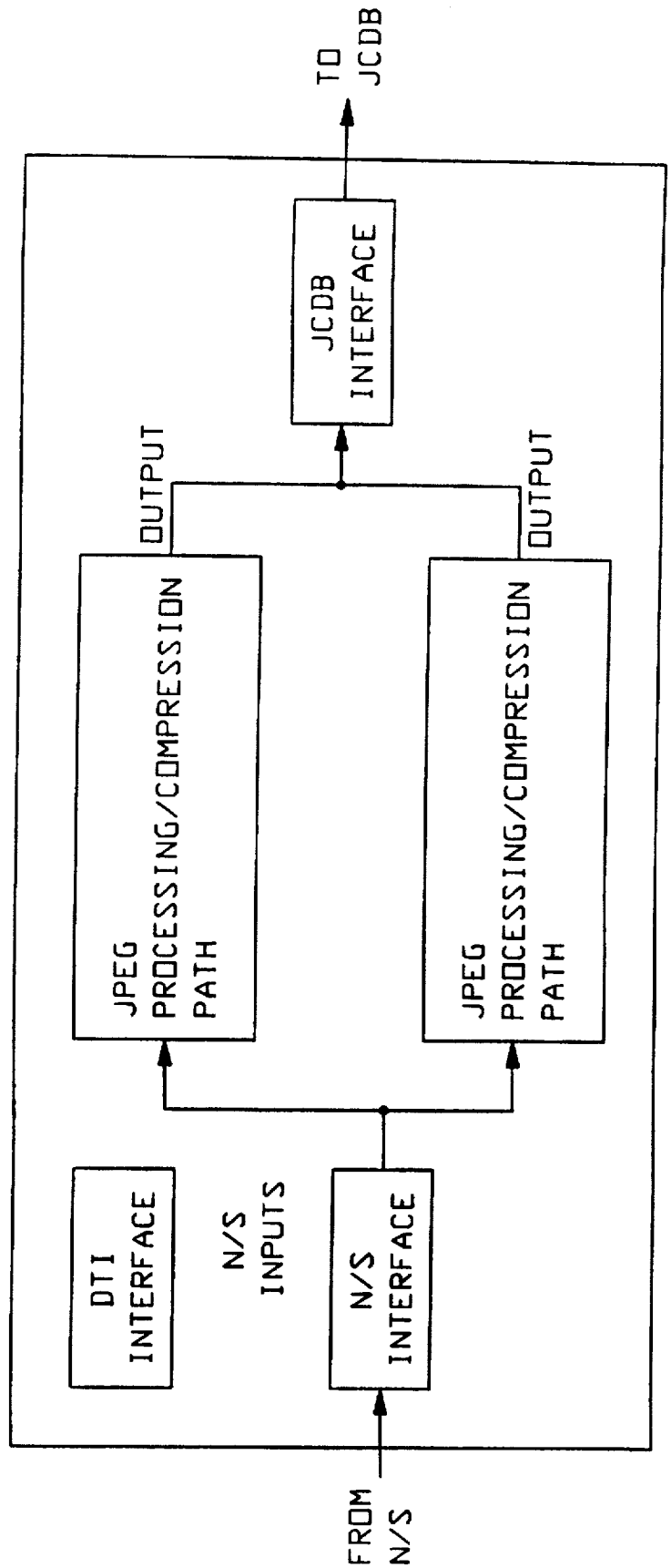
FIG. 1 is a block diagram of a document imaging module embodiment for such a system, made in accordance with the teachings of this invention.

Image Module, IM; FIG. 1

The JPEG Image Module (IM) is a device that in conjunction with a document processor allows image data from the front and rear of documents to be collected, compressed, packaged and (finally) transmitted to a mass storage device. The document processor is a device which is capable of transporting documents down a track, reading data encoded on the documents and providing that data to an application program running on a host computer and (finally) sorting documents to bins based upon that information. The IM provides outputs to alternative recognition devices such as a Courtesy Amount Reader (CAR) unit (1-23, FIG. 1) and mass storage devices such as a Storage Retrieval Module (SRM: 1-20, FIG. 1). Images can be retrieved from the SRM for data entry, or data correction. The new, augmented or corrected data is then passed on to the application mainframe. Data read by the CAR unit is also returned to the application mainframe. In this way the document data base can be more economically updated and corrected for use by the application program.

FIG. 1 is a block diagram of major functional portions of such an imaging module IM, apt for use with this invention. Preferably, module IM is used, as a printed circuit unit (board) for imaging/processing of images from one side of passing documents, with a second, like board (not shown) used for the other (Rear) side.

Module IM produces compressed 8-bit gray level (electronic) images (image data) at resolutions of about 100 pixels per inch. Image data is compressed using a "JPEG Baseline Sequential technique. JPEG is a family of gray scale image compression techniques adopted by the International Standards Organization (ISO) Joint Photographic Expert Group (JPEG) subcommittee, as workers realize. The compressed images are encapsulated in a Tagged Image File Format format (TIFF). TIFF is an industry standard format for the encapsulation of image data, as workers realize.

Salient Functional Units

In FIG. 1, it will be evident that an electronic camera Unit 1-1 captures successive images (e.g., of passing checks or like financial documents, front and rear, suitably illuminated; e.g., lamp illumination controlled by Unit 1-3). The camera uses a segmented linear "Charge Coupled Photo Diode" (CCPD) array ("segmented" meaning that the linear array of photo-diodes is subdivided into 8 segments or channels, each of which has its own output, thus effectively multiplying by the number of subdivisions the rate at which image data can be clocked-out—here the channels are numbered 0 through 7). The electronic image from each channel is digitized by an Image Digitizer 1-5 and presented, in parallel, to a pair of like Normalizer/Scaler (N/S) units: a master N/S 1-7 and a slave N/S 1-9 (e.g., on separate boards, each for identically processing four video data channels— e.g., four "even" numbered channels on Master, four odd on Slave). These channels are merged into a single output channel for compression (as further detailed below). Their output, the scaled-normalized image signal path, is indicated in FIG. 1. The transfers of data between the Digitizer, N/S, and other functions are more diagrammatically illustrated in FIG. 2, while processing/compression is further, similarly illustrated in FIG. 3. An additional output of normalized (unscaled) image data comes from each N/S board to provide image data to a CAR system 1-22, 1-21, 1-23. The output of the two N/S boards is presented to a Histogram/Compressor (HC) array preferably comprising from two to four like units (boards) 1-11A, 1-11B, 1-11C and 1-11D operating in parallel. The number of boards depends on required throughput (in documents per second) as determined by the document processors throughput and the type of error detection required. Each unit 1-11 processes and compresses image data from N/S units 1-7, 1-9 and implements two like independent data paths, each of which can process an entire single image.

The two paths on the H/C board can independently process and compress separate images or can compress synchronously the same image and compare compression result to detect failures. The sequencing of image data into, and compressed data from, the H/Cs is controlled by a state machine in the JPEG Compressed Data Buffer (JCDB) 1-15. When a HC's path's compression is complete it signals the JCDB. When the JCDB is ready to accept data from that path, it signals that path to output data for storage on the JCDB. A signal PDOCPRES_N which is activated when the N/S detects that a document is in front of the camera is applied from the N/S units to JCDB 1-15, whose state machine uses it to sequentially allocate images to H/C paths.

Buffer JCDB 1-15 is coupled to a Main Processor (MP) 1-16 which packages the JPEG compressed image data into the TIFF format employed by the system.

Further on Module IM, FIG. 1

The compressed data is transferred from the MP 1-1 to the Point-to-point Optical Link (POL board 1-19 which is a fiber-optic interface) for transmission to the Storage and Retrieval Module (SRM) 1-20. The SRM stores the images and, under the direction of the application mainframe, manages the TIFF packaged compressed image files for later distribution to image workstations (not shown) for viewing, correction or entry of associated document data.

The Diagnostic Transport Interface (DTI) 1-17 is one end of the interface between the document processor and imaging module IM. The Image Interface Board (IIB) 1-18 resides in the document processor and sends document data and control signals from the document processor to the DTI. The DTI receives this data and passes document data, across the Main Bus, to MP 1-16 for inclusion in the TIFF packet for the associated compressed image. The DTI also receives control signals from the document processor's tracking logic through the IIB 1-18 that indicate that a document is approaching the camera. These signals are passed on to N/S boards 1-7, 1-9 where they are used to prime the edge detection circuits to detect the leading and trailing edges of documents passing the camera (along the track).

The Character Recognition (CAR) subsystem 1-21,1-22 and 1-23 subsystem consists of two circuit boards: (see CAR Preprocessor or Bypass 1-22, CAR Port 1-21 and the CAR Unit 1-23). Here, only the Front N/S boards are linked to CAR subsystem. Both boards perform specialized image processing functions on the normalized image data from the N/S boards, they improve the chances that the Character Recognition Unit (CAR Unit) 1-23 will successfully read information from the document. After these processing steps the processed image data is sent to the CAR unit for recognition of data. The results of reading the data are returned to the document processor for inclusion in the data files stored on the application software mainframe. The information read successfully from the documents can be used to correct the data files on the mainframe.

Image and Data Synchronization

Module IM (FIG. 1) can be processing, compressing or storing images and be documenting data for as many as 25 images at any one time. It is important to make sure that the document's images and associated document data from the document processor remain in synchronization so documents are not misidentified.

As documents begin to move down the track of the document processor each document is detected by tracking logic (see below) and assigned a tracking identification code ("sync tag"). The sync tags are assigned sequentially to each image (e.g., by Software in DTI) to identify it and prevent its loss, as well as help later in sorting. It preferably is triggered on detection of a check (document) leading edge and comprises a 16-bit identifier code (for image, -frame etc.) assigned in FIFO order; preferably supplied by the DTI unit.

Operation of the document processor is such that there are multiple documents moving through the track at any one time. The document processor tracking logic is used to determine the physical location of a document in the track. The document processor also has subsystems, such as Magnetic Ink Character Recognition (MICR), readers that may generate data that is subsequently associated with the document moving through that subsystem. Module IM receives the sync tags and document data and queues them up in the memory of Main Processor (MP) 1-16, in a first in first out (FIFO) fashion; likewise the sync tags are stored in a FIFO queue on the NS. When a document moving down the track approaches IM camera 1-1, the tracking logic senses it and a signal is sent to the IM to alert the NS to find the leading edge of the document. When the document is found it activates the PDOCPRES_N signal, thus alerting the H/C units to the forthcoming image data. When the trailing edge of the document is detected by the tracking logic it sends a signal to module IM to alert the NS to find this trailing edge. When the trailing edge is found, the document's sync tag (see FIG. 3A) is pulled from the queue in the N/S and attached to the "document status field" (which is appended to the trailing end of the related image data).

The foregoing may be understood as applying to imaging of one side (e.g., Front) of a passing document. Processing image data for the other side (e.g., rear of a document) proceeds in a similar manner—preferably with a separate independent camera, digitizer, NS, HC, and JCDB boards.

The sync tags are used in module IM in the following ways to assure that image data from a given document are kept "in sync" (i.e., in sequence, same for any given document):

1—When the NS finishes processing an item, the Diagnostic Transport Interface (DTI) checks to make sure that the sync tags from both the front and rear master NS are the expected "next tags" (in sequence) and that they are identical.

2—The H/Cs use the sync tags to assure that the image data from the master and slave NS units are identical, assuring that these boards are "in synchronization" (i.e., handling data from same document). The HCs compress the image, then the sync tags are passed along with the compressed-image-data to the JCDBs, where they are queued-up (in FIFO fashion).

3—The JCDB interrupts the MP when it has image data available. The MP reads the image data and status bits (which include the sync tag) from the JCDB, and checks to see that the sync tag from the image read from the JCDB matches the expected sync tag as stored in its own memory queue.

4—The sync tag is also fed to the "CAR PREPROCESSOR OR BYPASS" 1-22 and Carport board 1-21 to keep the CAR unit synchronized with document processor flow.

Whenever a mismatch of sync tags is found, an error is declared and document processor flow is ordered to stop.

"Stop Flow" Requests

According to a feature hereof, a "Stop Flow Request" (SFR) is generated by DTI, JCDB, N/S, H/C or ID when they detect an "error condition": e.g., sync tag mismatch, or incorrectly matching document data with image data, or detection of conditions that would corrupt or render an image unusable. The JCDB detects such an SFR signal and interrupts the MP (e.g., before check processing is carried further); e.g., JCDB detects the SFR and latches the source thereof in a Stop Flow Accumulator (contained on the JCDB) for interrogation by the MP. Use of such Stop Flow Requests will reduce the number of documents, time, and complexity that would later be involved in "error recovery".

An example is as follows: a "leading edge not found" fault might be detected at NS unit (signal from the tracking logic received, alerting the IM to arrival of a document but the edge of the document cannot be determined from the image data). As a result, the N/S unit would issue a SFR to processor MP through the JCDB, terminating further processing of all images from this document—as well as of other items upstream of this item in the document processor's track. The MP first notifies the document processor to stop the flow of documents, and then finishes handling the image data it has confidence in (e.g., compressed images downstream of the point of fault detection). The mishandled document, and any documents that followed it through the transport, will have to be recovered from the document processor's pockets and repassed through the document processor on resumption of processing. This system may be set up for various Stop Flow requirements (according to the application involved) and to automatically, programmatically "mask" certain faults accordingly. For example some application could require a SFR if the trailing edge of a document is not found, yet other applications could be more forgiving and not require a SFR for this situation.

The advantage of this Stop Flow feature is that it reduces the number of documents that have to be repassed through the document processor when a SFR occurs - - - because the processor is notified immediately when an error condition generates a stop flow request, and because it is associated with a particular item or event; thus antecedent documents (conditions) can be handled normally, thus reducing the number of documents that must be specially handled to recover from an SFR event.

Monitor Camera, FIG. 1

The design of module IM also accommodates adding an optional Camera Quality Monitor unit (CQM) 1-13. The CQM monitors normalized image data and normalize scaled image data from the NS boards, as well as compressed image data being sent from the HCs to the JCDB. Preferably, one CQM monitors data on the IM for the front image, the other monitors data for the rear image. A variety of problems associated with the camera can be detected by analysis of the data collected at these points. As one example: when components in illumination system 1-3 age, lamp output may dim. Monitoring the normalized data and checking for a long term change in average document brightness, can allow one to notify service personnel that replacement or adjustment is required before the images are badly degraded. The front and rear images are each monitored by their own CQM.

N/S Details

The Normalizer/Scaler function is, as above noted, preferably implemented by a two board set (e.g., see FIG. 1: Master 1-7 processing the four even-numbered channels from Digitizer 1-5; Slave 1-9 similarly processing the four odd-numbered channels therefrom). These boards 1-7, 1-9 operate in synchronism, with one, the master, arbitrating. Master N/S Unit 1-7 also provides "document synchronization" signals (such as PDOCPRES_N) used by downstream boards to identify that a document is being imaged. The N/S pair also provide image data to the CAR unit.

The N/S units employ a scan capture circuit to capture pre-normalized image data for use in generating the numeric tables required to normalize the image data during normal operation. Upon a command from the DTI, each N/S starts collecting pre-normalized image data; each channel has its own capture circuit capturing 16 consecutive scans of image data (128 bytes of data per scan) into a first in first out (FIFO) memory that can be read by the DTI board for transfer again to the MP for processing. Data is collected as part of a calibration procedure in which the camera images a uniformly white target, and then a black target, to provide "ideal" white and black stimuli to the camera. Software running on the MP executes an algorithm that transforms this raw data into data tables suitable for normalizing image data. The data tables are transferred from the MP to the DTI and then stored in "Look Up" tables on the N/S.

The N/S normalizes incoming image data using the information in the look-up tables (preferably two 64K×8 RAM, one for test). Normalization is accomplished by using the image data and its position in the scan to sequentially address the look-up table. The content of each address has been precalculated by the normalization software running on the MP from pre-normalized data (collected during calibration) to be the normalized value of the image data for that pre-normalized value and position in the scan. There are 128 possible output values for each of the 128 pixel positions in the scan.

Scaling is preferably based on PROM look up tables; the tables allow the selection through software running on the MP of up to 8 "scaling factors", (from a factor of $11/16$), to a factor of $5/16$ along with method of scaling. The preferred scaling is $8/16$ ($1/2$) using a 2×2 pixel window average method.

Document Edge Detection is performed with an algorithm whereby each channel compares the average brightness of "the present scan line with the average brightness of the transport with no document present". When no document is present, the detector averages and stores the average brightness of the transport ("no document brightness"). Document tracking logic in the document processor notifies these circuits that a document is about to enter, or leave, the range of the camera, and that comparisons should begin. If a significant change of brightness occurs in a channel, then (by this) that channel indicates that it has found an edge. Leading edges are found when any one of the 8 detectors finds that brightness has increased above the stored "no document average" by a preferred threshold of 14 gray levels, and PDOCPRES_N is asserted. Trailing edges are declared if all 8 channels have found that they have returned to within a preferred 18 gray levels of the "no document" average; then PDOCPRES_N is cleared. If a leading edge is expected and not found by any detectors after a prescribed time, then "leading edge indication" is "forced" by asserting PDOCPRES_N. This implies that the document image may have problems, so this occurrence is flagged in "document status". The status data is transferred along with the normalized and scaled (and later compressed) image data as it moves through the system.

Figure 3:
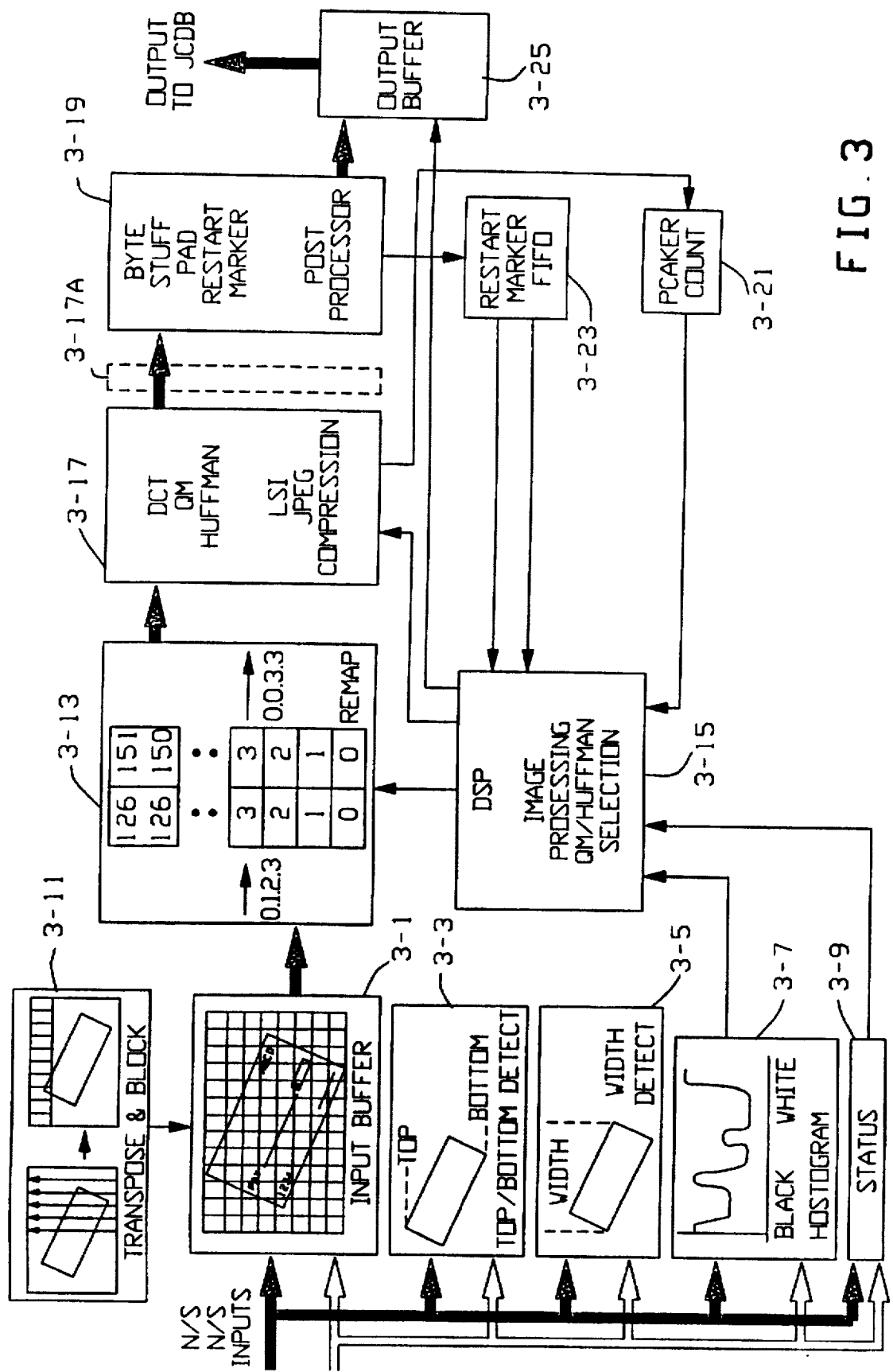
Figure 4:
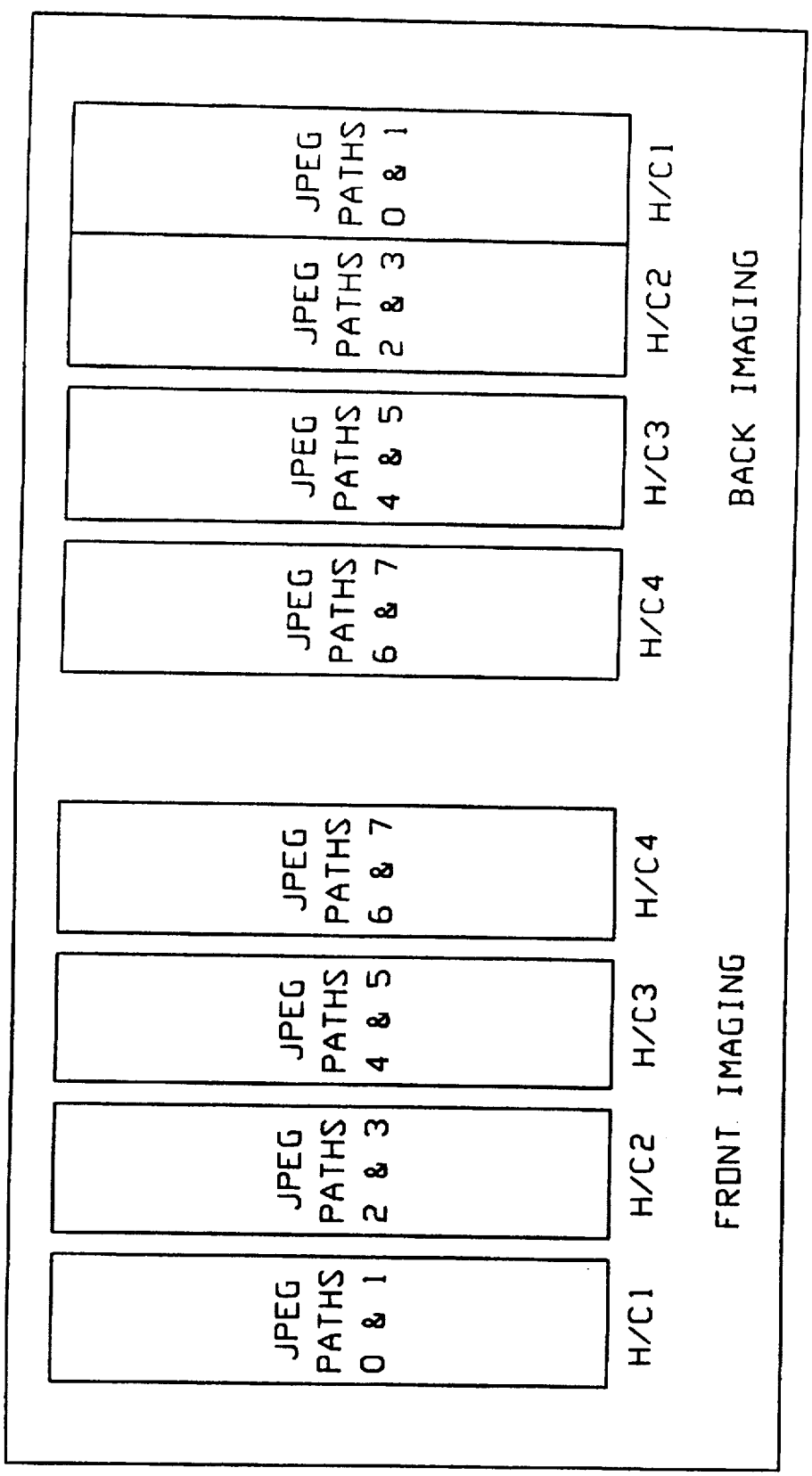
FIG. 4 is a diagram of eight related processing paths.

Details of Histogram Compressor, FIGS. 1-3

The Histogram/Compressor functions are, as noted above, preferably performed in two like HC boards per side. Module IM accommodates up to 4 HC boards per side if height throughput or increased levels of fault detection so require. Each H/C contains two image paths, and each path is capable of processing and compressing an entire image as received from the master and slave NS boards. The JCDB's state machine determines that an image has arrived via the PDOCPRES_N signal and selects the HC path to receive the images from the master and slave NS; paths are assigned in a rotating sequence and according to the type of fault detection required. The preferred configuration uses rotating redundancy to periodically verify HC operation; thus paths can be assigned in the following order: 0–1, 2, 3, 0, 1, 2–3, 0, 1, 2, 3, 0–1 . . . etc. The HC boards contain logic that detects if the output data of the two paths does not match (when they are both processing the same image); such a detection is an indication that a fault has occurred on one of the two paths. "Rotating redundancy" is useful for checking for "hard failures". If "transient failures" are of concern to a particular application, then additional HC boards can be added to the system and image data can be processed fully redundantly. As a feature hereof, this HC unit allows comparison of two compressed images in their entirety (e.g., vs by-channels).

A HC path receives the combined data from the master and slave NS boards and combines the odd and even channel data into one image which is stored in a buffer memory (3-1, FIG. 3). As the data is being input to the memory, it is sampled by a histogram width-detector 3-5, and a top and bottom edge detector 3-3. The histogram circuit 3-7 builds a histogram of image data values composing the document image. The histogram data is used to modify the image (as described later). The top and bottom edge detectors 3-3 sample the image data and attempt to find the top and bottom of the document image (within the full height of the input data scan).

There are 1024 pixels in the preferred embodiment of the IM scan; a typical 2.75 inch item will occupy only 550 pixels of a scan. The preferred algorithm looks for the highest and lowest occurrences of "non-background data" within all the scans of a document. In the preferred embodiment, a "non-background" is declared if there is a gray level transition within 5 pixels. The points determined for top and bottom, and width, are made available to the Digital Signal Processor (DSP 3-15) which uses them when pulling the document image from the buffer. Finding the width (e.g., lead and trail edges) and the top and bottom of images allows the Digital Signal Processor 3-15 (DSP) to handle only genuine document data and ignore all else - - - thus improving throughput and providing images that do not have extraneous data associated with them.

The software running on DSP 3-15 executes an algorithm which uses the histogram data to alter the original image data in the HC memory in a manner that reduces contrast and stretches gray levels - - - thereby improving legibility and compression characteristics (by means of the Remap 3-13).

The HC compresses images in "two pass" fashion. The first pass preferably uses a JPEG Quantization Matrix (QM). The QM is a set of numeric factors used by the JPEG algorithm to affect image compressibility and is known to workers. The preferred (or target) QM is picked in the course of IM design to optimize both image quality and the size of the resulting compressed image packet. The same QM is used for first pass compression of all images.

When "First compression" is complete, the size of the compressed image data packet is checked, along with image size. If the packet is too large (considering the size of the image), an alternative QM is used for "second pass compression"; the alternative picked is determined from experience and is embodied in the algorithm executing on the DSP. If the packet is smaller than expected, a less aggressive QM may be used; otherwise the target QM is reused.

After second pass compression, the HC builds a standard JPEG compressed image structure in Output Buffer 3-25 and appends to it the status bits received from the NS 3-9, along with its own status bits and other information.

When compression is complete, data is queued in Output Buffer 3-25, and the JCDB is notified that the path-work is completed. The JCDB notifies the HC that it is ready to receive the compressed data packet (and status) when it selects the HC for output.

Thus, a typical such HC unit (e.g., 1-11A for bits 0, 1) may do the following:

1—Sample alternate pixels and assign one of 64 "bins";

2—Locate image-top, -bottom

3—Measure image-length

4—Using its DSP (digital signal processor) histogram data, generate a "Remap Table" to reduce contrast and stretch grey level, and so make the bit image more legible and more compressible;

5—Initiate first compression;

6—Monitor results of First compression (and "status" from associated N/S unit) to build "header" in JCDB. And, if maximum allowed compressed size is exceeded, will accordingly translate images (from the bottom); and initiate a second compression if needed; and 7—Prepare bit set for application to JCDB.

JCDB

Buffer JCDB 1-15 (FIG. 1) provides the interface between the HC paths and the MP 1-16. It preferably comprises a set (e.g., 16×128 kilobyte) of compressed image buffer units, preferably operated as eight redundant buffer pairs (Primary-, Secondary-). The contents of the primary buffer is compared to the contents of the secondary buffer, upon readout, as a method of validating hardware performance. These buffers are directly readable and writable by the MP via a local bus extension of the microprocessor of the MP. Should extra buffering capacity be needed, (e.g., the POL is busy), the JCDB can fall out of redundant operation and use its 8 secondary buffers to store images. When this happens, the MP notifies the document processor to STOP document flow because there is a danger of running out of buffer space (which could necessitate a complex recovery procedure). The JCDB, as noted earlier, has a state machine which controls the selection of NS-to-HC paths for input of images from the NSs and the transfer of compressed image packets out of the HCs to the JCDB. Preferably, the MP can program the state machine on the JCDB to operate module IM with 2, 3, or 4 HC boards. The JCDB also receives the Stop Flow Request lines from all boards. If any of these lines is activated the JCDB notifies the MP. Each of the NS, HC, or JCDB boards in module IM can have any of their detected fault conditions activated, by command from the MP, to trigger a "Stop Flow request" line to the JCDB. Results of this activation were discussed earlier.

Functions of JCDB (a) Controls selection of paths (input/output) to/from HC;

Thus, can be programmed to operate with 2, 3 or 4 HC boards; also controls run-time testing of HC units by selecting both of its paths to process image data. Also, monitors "busy" and "ready" signals from HC units to accommodate document throughput;

(b) Verifies size of transferred image;(c) Provides "Sync Tag" data from a received image to DTI for verification;

(d) Generates "interrupts" (e.g., "STOP Flow"?) to MP and DTI upon receipt of image from HC array.

Image Digitizer 1-5

Image Digitizer ID 1-5, receives the output of the camera in the form of 8 pairs of analog signals (e.g., 8-odd, 8-even pixels from 8-segment CCPD) plus a clock signal, and a "camera side" identification (front vs rear). The "side information" is determined at time of manufacture by installing a jumper. Preferably, this ID output comprises: eight channels of serial, digitized video, with parity for each channel. The preferred clock rate is 8.125 MHz, with a 900 ns idle period between every scanline (16.7 us). Digitizer ID also has a diagnostic memory that can be loaded with test patterns by the DTI over a special (C and D) bus.

When the document processor tracking logic does not indicate any documents approaching the camera, the DTI senses this and commands a diagnostic RAM to inject test patterns into the eight channels. Identical data will be output on all 8 channels. These patterns are used by the NS to test normalization and scaling logic (by comparing data); they are also similarly used to test the interface between the ID and NS boards. The NS normalization circuit must alter its operation when test patterns are present on the channels to assure that the outputs of the multiple normalizer circuits are identical. The test portion of the normalizer look-up table is used to provide a 1 to 1 mapping when test patterns are activated, thus assuring that "data-in" matches "data-out".

JPEG Compression Path Functions

The Block diagram in FIG. 3 (as aforenoted) indicates the preferred functions performed along a single JPEG processing/compression path on a preferred H/C PCB. Two independent JPEG processing/compression paths are implemented on each H/C PCB. These blocks are characterized briefly as follows:

a—N/S Inputs

The JPEG compression path receives "Normalized Scaled" (N/S) image data from the N/S hardware in two serial, 8-bit paths (see two N/S inputs, to 3-1, -3, -5, -7, -9). Each path contains 4 Channels of time-multiplexed, scaled scans; scaled-down to a maximum of 137.5 pixels per inch. The pixels are delivered cross both paths at a rate of 50 ns per pixel (20 MHz). Each pixel is 7 bits representing 128 grey levels with the MSB ("Most Significant Bit") of the 8-bit path set to 0.

b—Input Buffer, 3-1

The entire scaled image is stored in a 1 Meg×8 Buffer 3-1 as it is delivered from the N/S hardware.

c—Top/Bottom Detect, 3-3

As the image is being received from the N/S hardware and stored in Input Buffer 3-1, the Top/Bottom Detect Circuitry 3-3 finds the Top and Bottom of the scaled image. The picture shown in FIG. 3 illustrates an exaggerated skew condition that may occur (usually to a much smaller degree) as the sorter moves the check past the CCD camera. The Top/Bottom Circuitry "finds" the extreme Top and Bottom locations.

d—Width Detect, 3-5

Lead-edge and Trail-edge detection is done by the N/S hardware. The Width Detect hardware (Stage 3-5) counts the number of scaled pixels scans between the extreme Lead and Trail edges as shown in FIG. 3.

e—Histogram, 3-7

As the image is being received from the N/S hardware and stored in the Input Buffer, a Histogram Circuit 3-7 samples every other pixel (one pixel every 50 ns, switching between both signals paths from the N/S hardware) and sorts the 128 grey level pixels into one of 64 Histogram Bins (LSB, or Least Significant Bit, of 7-bit pixel value is ignored). Once the image is entirely received, the final Histogram will have sorted 50% of the scaled image's pixels, selected in a checkerboard arrangement across the entire image, into the 64 bins that comprise the Histogram 3-7. Pixels above and below the detected Top and Bottom borders of the image are included in the Histogram, but pixels outside the detected Width are excluded. Each bin can record up to 64K occurrences of adjacent grey levels and will "peg" at 64K if that bin overflows.

f—Status Block 3-9

Status and other image-related information is appended to the Trailing Edge of the scaled image as it is delivered to the JPEG processing/compression path from the N/S hardware. This information is buffered in Status block 3-9 so that it can be retrieved and sent on with the compressed image.

g—Transpose and Block Unit 3-11

The N/S hardware delivers scaled image data in Vertical scans spanning 8 Channels and starting from either the Top or Bottom of the image (depending on camera orientation), while moving vertically. JPEG compression requires image pixels to be compressed in 8×8, raster-scanned, Pixel Blocks. Pixel Blocks are then scanned in the same method as pixels within a block: horizontally across the Width of the image, and then vertically between the Top and the Bottom. This "Transposition and Blocking" Operation (3-11) can be started at any of the four corners of the image. Pixels outside the Top and Bottom borders of the image, and outside the Width of the image, are not addressed during transposition—thus eliminating useless track background data from the Compressed Image Packet. The output of the Transpose and Block Circuitry 3-11 serves as an address to the 1 Meg×8 Input Buffer 3-1. (See FIG. 6, also.)

h—Remap Unit 3-13

Image processing is done by changing (Remapping at 3-13) the 7-bit scaled pixels in the Input Buffer 3-1 to 8-bit image-processed pixels as the image is being compressed.

h'—DSP Unit 3-15

A DSP Unit 3-15 (Digital Signal Processor) determines the Remap Values by reading the 64-bin Histogram (from 3-7) along with inputs from 3-9, 3-5, 3-3), executing the image processing algorithms and loading the 128 resultant "Remap Values" into a "1 to 1" Remap Memory at 3-13.

j—LSI JPEG Compression, 3-17

A DCT (Discrete Cosine Transform), quantization and Huffman coding for JPEG compression are done in a Chip Set, (3-17, preferably from the LSI Logic Corporation). This Chip Set 3-17 does not need to be "throttled" as it compresses an image, and, therefore, "compression latency" through this Chip Set is deterministic. Scaled, remapped pixels are sent through the LSI Chip Set 3-17 at a 25 MHz rate. The LSI output is a 32-bit word containing JPEG compressed data (but does not have bytes "stuffed" or restart codes inserted, these being inserted at Block 3-19).

k—Packet Counter 3-21

This Counter records the amount of compressed data emerging from the LSI JPEG Compression Chip Set 3-17. This Count is used by the DSP Unit 3-15 to retrieve the results of first pass compression so a second QM can be selected for the second (final) compression.

l—Post Processor 3-19

The Post Processor performs the JPEG required byte stuffing and Restart Marker insertion not done by the LSI Chip Set. The Post Processor funnels the 32-bit outputs from the LSI Chip Set down to a 16-bit wide Output Buffer 3-25, inserting stuffed bytes and restart codes when necessary.

To ease the location of entropy-coded segments (compressed data between Restart Markers) in the final Compressed Image Packet, restart codes are inserted on 32-bit boundaries by the Post Processor Unit 3-19 (codes recorded in 3-23). Therefore, the Post Processor must insert padding bytes, when required, to align restart codes on double-word boundaries.

m—Restart Marker Table (FIFO) 3-23

A table of addresses pointing to the location of Restart Markers in the Compressed Image Packet are stored in the Restart Marker FIFO 3-23 and can be used by the DSP 3-15 to truncate images on entropy coded segment boundaries.

n—Output Buffer 3-25

The JPEG processing/compression path assembles the Compressed Image Packet in a 64K×16 Output Buffer 3-25. Once a Compressed Image Packet is completely assembled, it can be burst-transferred to the JCDB next component (JPEG Compressed Data Buffer) in the imaging system.

In sum, the DSP 3-15 performs the following functions:

i—After an image is input from the N/S, the DSP 3-15 reads the 64-bin Histogram, executes the image processing algorithms and loads the resultant Remap Table into the Remap RAM (at 3-13);

ii—Prior to first pass compression, the DSP loads the default QM and Huffman tables into the LSI JPEG Compression hardware;

iii—After first pass compression, the DSP retrieves the results (of first pass compression) from the Packet Count Register 3-21, and the image dimensions from the Top/Bottom and Width Detectors, then selects a new (second) QM and Huffman table to achieve the proper compression results for a second compression, and loads this chosen QM and Huffman table into the LSI Chip Set;

iv—After second pass compression is complete, the DSP inserts all pertinent header information into the Compressed Image Packet in Output Buffer 3-25.

JPEG Processing/Compression Functions
Implemented in Hardware

In the previous section, the functions of the JPEG processing/compression path were introduced. In this section, the hardware-intensive functions are described in detail. The DSP functions, although critical to operation of the JPEG processing/compression path, are software based and not discussed in this section. The hardware functions next detailed are as follows, then detailed:

Histogram
Top/Bottom Detection
Width Detection
Status Capture
Transpose and Block - Input Buffer
Remap
LSI JPEG Compression
JPEG Post Processor
Restart Marker FIFO
Packet Count
Output Buffer The DSP, via software, executes the "grey level stretch and contrast reduction" algorithms by reading the 64 bin histogram of an image and generating a 128-entry remap table to be used by the Remap hardware. Also, the DSP chooses and loads the LSI chips set with the QMs and Huffman tables needed for first and second pass compression. Lastly, the DSP builds the necessary header data, (surrounding the compressed image data), and loads this header data into the Output Buffer 3-25.

Histogram

The Histogram is generated in unit 3-7 as the image is being delivered from the N/S hardware and stored in the Input Buffer 3-1. The Histogram could have been generated without any custom hardware by having the DSP unit scan the contents of the Input Buffer after the image has been loaded. This, however, would greatly increase the time required for the JPEG processing/compression path to process the image because:

1—Not only would it take relatively long (compared to custom hardware) for the DSP to subsample the contents of the Input Buffer, but 2—this sampling could not be done until AFTER the image was stored in the Input Buffer.

Thus, by generating a Histogram with custom hardware WHILE the image is being input, the Histogram is available to the DSP as soon as the image has been input.

The only apparent drawback to so generating the Histogram during input of the image is that the Histogram is being generated BEFORE the Top and Bottom boundaries of the check image have been determined (lead and trail edges of image are predetermined by N/S hardware). This means that pixels representing track background, above the top and below the bottom borders of the check image, are included in the Histogram. This will cause the "darkest" bins of the Histogram to be fuller than if the boundaries were known prior to generating a Histogram. This apparent drawback, in reality, is inconsequential, since the image processing algorithms, selected performed by the DSP according hereto, are not significantly affected by the quantity of pixels in the "darkest" bins.

The Histogram circuitry samples 50% of the pixels in the image by sampling pixels every 50 ns (20 MHz input from N/S) from one of the two serial N/S inputs (Channels 0, 2, 4, and 6) and then from the other (Channels 1, 3, 5, and 7). The net effect is that the pixels sampled are arranged in a checkerboard pattern across the image. As a pixel is sampled, the "upper 6 bits" of the 7-bit pixel (LSB is ignored) are used to address a 64-bin Histogram RAM. The contents of the RAM at the addressed location are extracted, incremented by 1 and reloaded into the RAM. These iterations of reading, incrementing and writing must be done every 50 ns. Although a 20 MHz synchronous clock is used to begin every iteration, the reading, incrementing and writing are performed with asynchronous, pipelined logic using 2 CPLDs (Complex Programmable Logic Device) and 2 SRAMs (Static Random Access Memory).

Each of the 64 bins is 16-bits wide and can therefore record 64K occurrences of adjacent grey levels (e.g., 100 0101 and 100 0100 are sorted into bin 33). If, during the "Read-Increment-Write" iterations, any of the bins become full (reach a count of 0xFFFF), this bin will NOT overflow with any additional pixels (reset to 0x0000) because the bin will peg at 0xFFFF. This is essential for the image processing algorithms to get a good approximation of the grey level content and distribution in the image.

Transpose and Block Input Buffer

The Input Buffer 3-1 is used to store the contents of the scaled, normalized image so that it can be transposed, grouped into 8×8 pixel blocks and sent to the compression hardware. Not only is it necessary to store the entire image for transposition purposes, but it is essential, to achieve predictable compression results, to perform "two-pass compression" on a fixed input image.

The Transpose and Block function (see 3-11) is used to generate the 20-bit address needed to access the 1 Meg×8 Input Buffer. It is this function that first stores the image data into the Input Buffer 3-1 as it is delivered from the N/S, and then removes the data in transposed, 8×8 blocks during each of the two compression passes.

Figure 5:
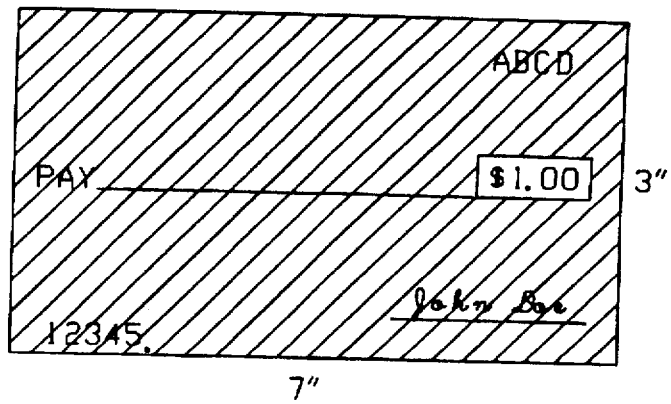
FIG. 5 is an item-related diagram of a subdivided Input Buffer for the array in FIG. 3, while FIGS. 6 (6A–6D) indicate how the item in FIG. 5 is preferably addressed and processed.
Figure 5:
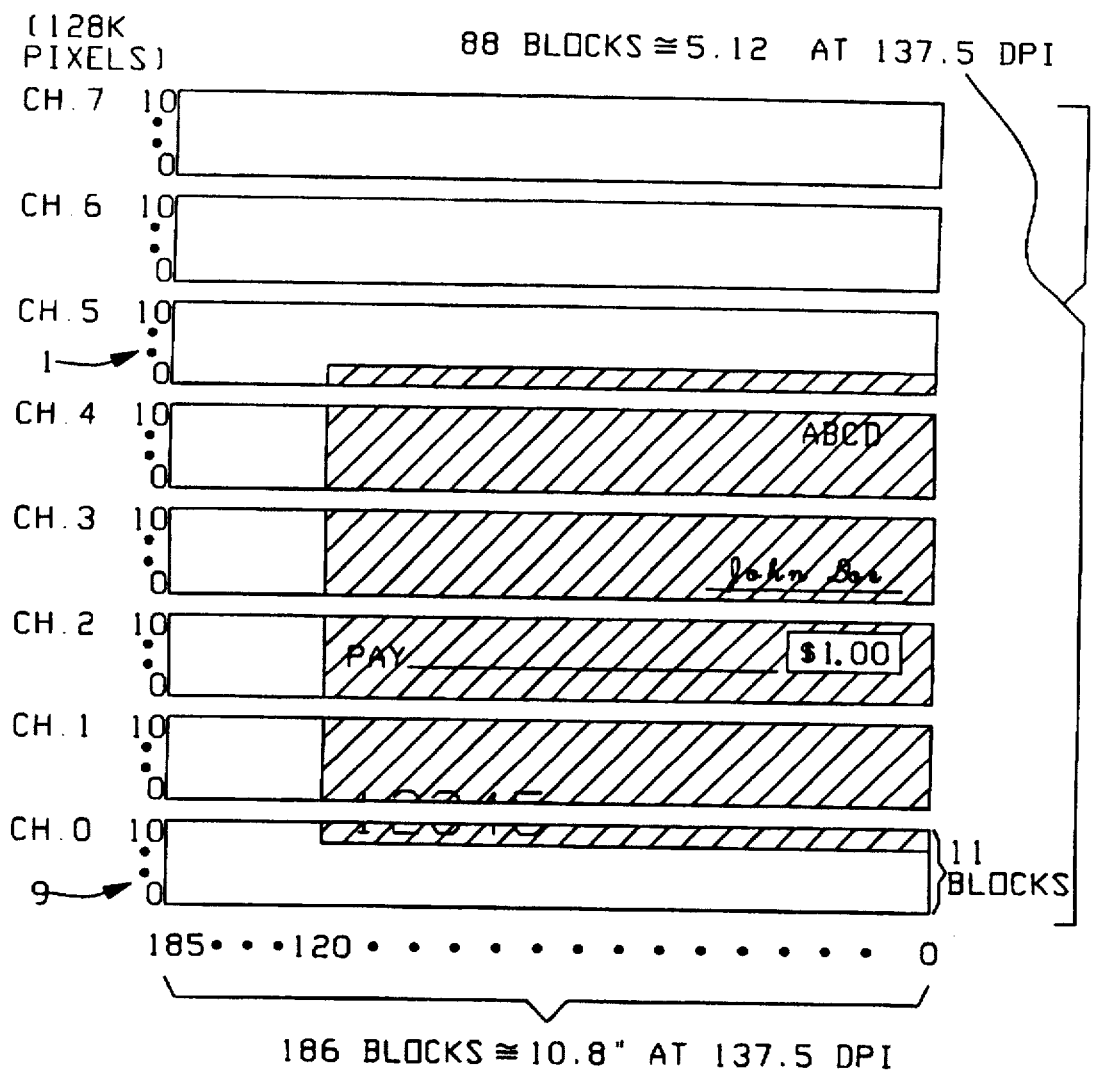
Figure 6:
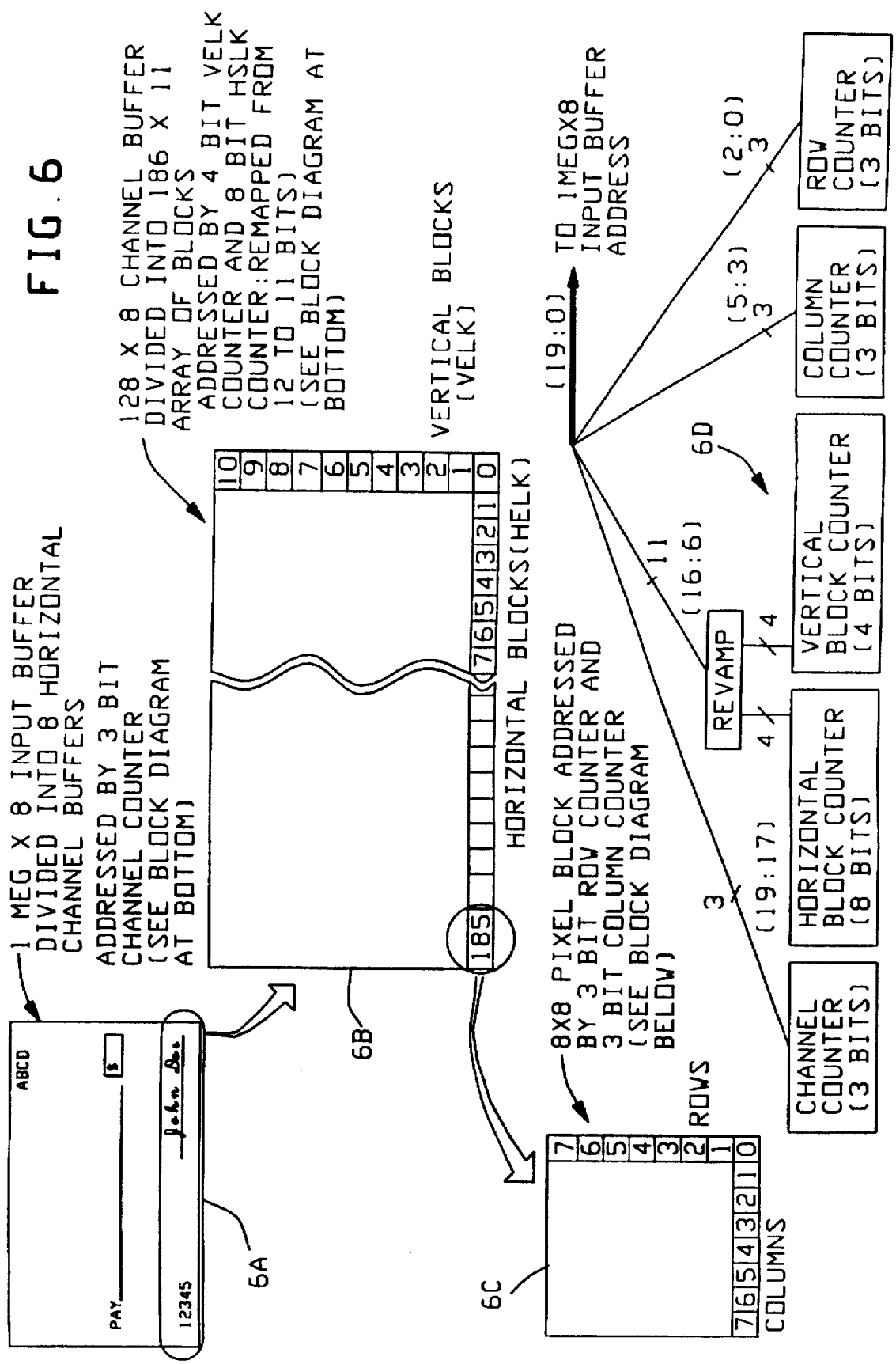

To understand how this is done, it is important to know how the 1 Meg×8 Input Buffer 3-1 is spatially divided. This arrangement is shown in FIGS. 5, 6. Since the Input Buffer is byte-wide, each byte will hold one 7-bit pixel (MSB is 0). The 1 Meg×8 buffer is first divided into eight, horizontal, 128K×8 Channel Buffers representing the 8 channels of image data from the N/S (e.g., see FIGS. 5, 6A). The 3 MSBs of the 20 address lines access one of the 8 channels.

Each 128K×8 Channel Buffer is divided into an 186×11 array (FIG. 6B) of 64-pixel blocks. The reason for this arrangement will be explained later. Eleven of the 20 address bits are used to select the block within the Channel Buffer. Finally, each block is divided into an 8×8 array of pixels with the 6 LSBs of the 20 address bits used to select the pixel within a block (FIG. 6C).

The Channel Buffers are arranged in an array of blocks composed of 11 horizontal rows by 186 vertical columns. Because the maximum scaling resolution acceptable by the JPEG processing/compression hardware is 137.5 dpi (¹¹⁄₁₆ths scaling of 200 dpi captured image), the maximum number of pixels processed, per vertical scan in one channel, is 88. Since there are 8 rows of pixels per block, 11 blocks are needed to cover the vertical dimension (FIG. 6B). One vertical column of 11 blocks consumes 704 (11×64) memory locations. Since there are 131072 (128K) locations in each Channel Buffer, up to 186 (131072/704=186.18) columns of 11 blocks can fit inside the memory. At 137.5 dpi (¹¹⁄₁₆ths scaling), this translates into a horizontal measure of 10.8 inches . . . more than enough to store the maximum check width of 9 inches. It is rare that some of the columns on the "far left" (see FIG. 5) of the Channel Buffer would ever be used, since the average check length would be between 6 and 7 inches. Likewise, if scale factors less than 137.5 dpi (11/16ths scaling) are used, the block rows near the top of the Channel Buffer will not To access the Input Buffer, (3-1, FIG. 3), the hardware implements five counters listed below (and shown in FIG. 6D):

| Channel Counter | 3 bits | Accesses the 8 horizontal Channel Buffers that comprise the Input Buffer |
| --- | --- | --- |
| Horizonal Block Counter | 8 bits | Accesses the 11 rows of blocks in each Channel Buffer |
| Vertical Block Counter | 4 bits | Accesses the 186 columns of blocks in each Channel Buffer |
| Column Counter | 3 bits | Accesses the 8 columns of pixels in each 8 × 8 block |
| Row Counter | 3 bits | Accesses the 8 horizontal rows of pixels in each 8 × 8 block |

Because the Vertical Block Counter and Horizontal Block Counter are not fully utilized (11 of 16 and 186 of 256 respectively), their combined values are remapped, via a "PROM look up table", to form a Block pointer value consisting of 11 bits. In total, therefore, 20 bits are needed to access the entire Input Buffer 3-1 (FIGS. 3, 6D).

By controlling the five counters described above (FIG. 6D) and changing their operating parameters (when they are incremented, when they are reset or preset and whether they count up or down), the hardware is able to store a vertically scanned image in the Input Buffer 3-1 and then unload, in 8×8 blocks, starting from either of the four corners of the image.

The following describes detailed control of the five counters during image capture and image compression.

Counter Control During Image Capture

During image capture, the N/S hardware delivers vertical scans of pixel data in two serial pixel streams as shown in FIG. 2.

To store ONE vertical scan, the JPEG processing/compression hardware must store these pixel pairs at two separate locations in its 1 Meg×8 Input Buffer (FIG. 5) simultaneously. For this reason, the least significant bit of the Channel Counter is not used during image capture because pixels are received in pairs (from channel 0/1, 2/3, 4/5 and 6/7 respectively) and must be stored in two separate channels of the Input Buffer simultaneously. As valid pixel pairs are delivered from the N/S hardware, the Row Counter (FIG. 6D) is incremented. When the Row Counter rolls over (every 8 pixels), the Vertical Block Counter is incremented. When the Vertical Block Counter reaches the scale factor (e.g., when the Vertical Block Counter reaches 11 for 11/16ths scaling), the Vertical Block Counter is reset and the Channel Counter is incremented by 2. When the Channel Counter rolls over from 6 to 0, the Column Counter is incremented. In this fashion one vertical scan is stored in the Input Buffer (3-1).

Every 8 scans, the Column Counter will roll over and the Horizontal Block Counter is incremented. Once the image is completely input, the Horizontal Block Counter will indicate the width of the scaled image in units of 8 pixel blocks.

Counter Control During Compression

To understand the control of the counters during compression, use FIG. 5 for reference. In this figure, an image has been stored in the Input Buffer during image capture. The valid portion of the image lies between Horizontal Block (HBLK) #0 and HBLK #120 (as determined by the width count) and between channel 5, Vertical Block (VBLK) #1 and channel 0, VBLK #9. In this example, compression will begin at top left corner of the image and will proceed left to right, top to bottom. Compression direction can begin in any of the 4 corners of the captured image and counter control will be slightly different for each compression orientation.

To start, the Channel Counter is preset to 5, the VBLK counter is preset to 1, the HBLK counter is preset to 120, the Column Counter is preset to 7 and the Row Counter is preset to 7 (upper left-hand corner of image). For JPEG compression, pixels must be raster scanned one pixel at a time, one block (64 pixels in 8×8 array) at a time. If the image is being compressed left to right, top to bottom (as it is in this example), all 64 pixels within the block must be read in the same direction before another block is read. Therefore, to read one 8×8 block, the Column Counter is continuously decremented (from 7 to 0) and every time the Column Counter rolls over (7 to 0) the Row Counter is decremented. Once the entire block has been read (64 pixels), the HBLK counter is decremented (moving left to right) and 64 pixels are read from the next block. After all 120 blocks are read in a row (HBLK counter reaches 0), the VBLK counter is decremented (moving top to bottom), and the HBLK counter is preset to the image width (left side or 120 in this example). Once the VBLK, HBLK, Column and Row counters reach 0 (bottom right corner of a channel), the Channel Counter is decremented, the VBLK counter is preset with one less than the scale factor (top of the channel or 10 in the case of 11/16ths scaling), the HBLK counter is preset to the width (left or 120 in this example) and the Column and Row counters are preset to 7 (top right corner of a block). Counter control proceeds until the pixel at the bottom right corner of the image is read (in this example CH=0, VBLK=9, HBLK-0, Column=0, Row=0); then compression terminates.

Figure 7:
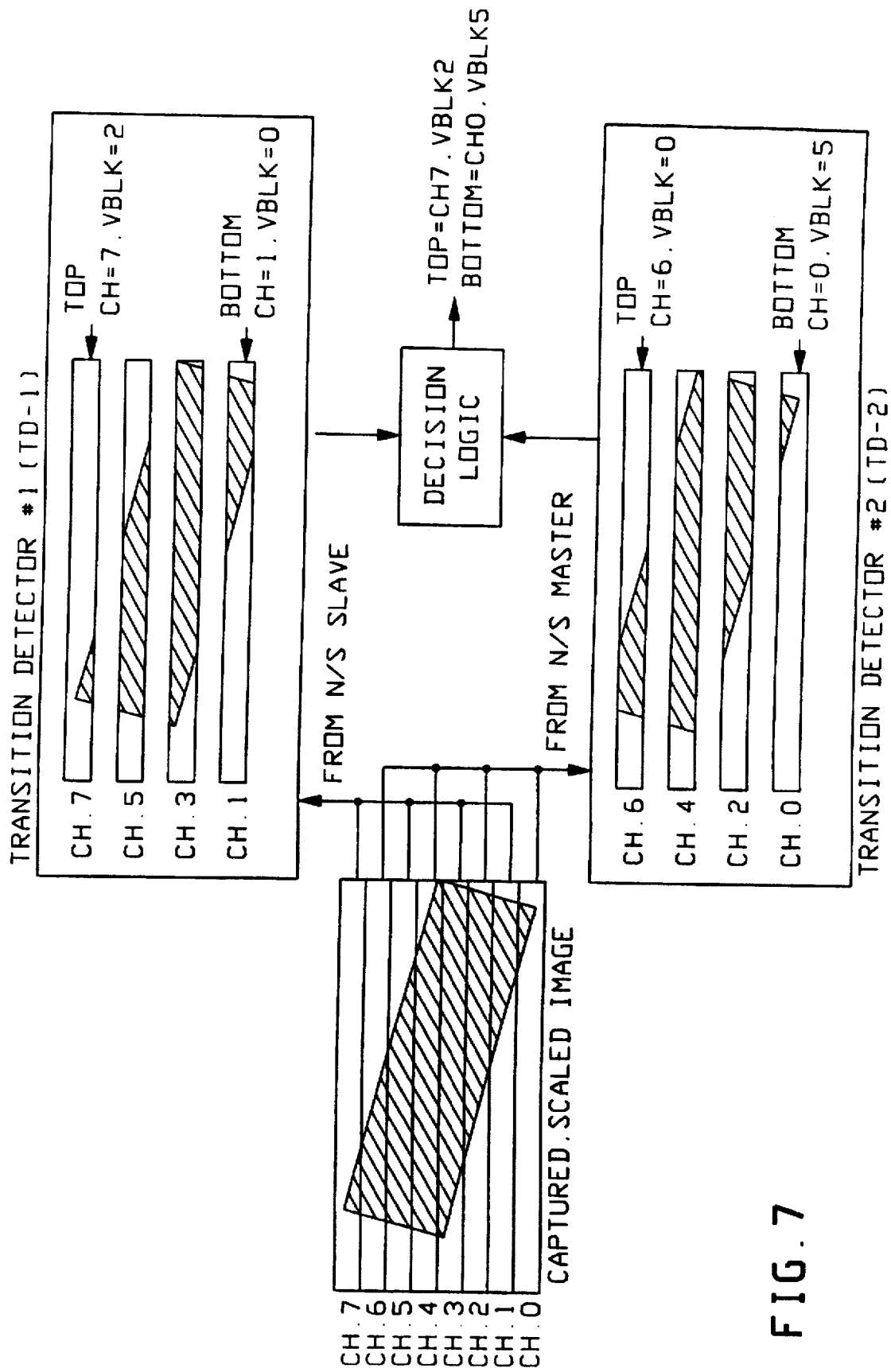
FIG. 7 similarly illustrates how the top/bottom of the item are detected for such processing in two four-channel streams.

Top/Bottom Detection (e.g., see 3-3, FIGS. 3,7)

The top and bottom borders of an image are detected as the image is being delivered from the N/S hardware and stored in the Input Buffer 3-1.

The borders could have been found without any custom hardware by having the DSP scan the contents of the Input Buffer after the image has been loaded. This, however, would greatly increase the time required for the JPEG processing/compression path to process the image (e.g., not only would it take relatively long for the DSP to sample the contents of the Input Buffer, but this sampling could not be done till AFTER the image was stored in the Input Buffer). By finding the borders with custom hardware WHILE the image is being input, the borders are available to the DSP as soon as the image has been input—thus saving time.

The top and bottom borders detected by the hardware are relative to the scan direction of data received from the N/S hardware. In other words, scans are assumed to be "pixel-wide" vertical strips spanning all 8 channels starting at the bottom block of channel 0 and proceeding to the top block of channel 7. The bottom border of the image is the lowest occurrence of image data relative to the scan direction. This may actually be the top of the physical image, depending on which camera is capturing the image (front or back) and how the check was loaded in the track (e.g. upside down?)

The resolution of the border detection circuitry is in units of blocks, not pixels. Therefore, borders are reported according to the channel and block row within the channel. A typical example of bottom and top borders detected by the hardware are BOTTOM=channel 0, row 6; TOP=channel 6, row 3.

Borders are determined on a "scan-by-scan" basis. Initially, prior to receiving the first vertical scan of an image, the top border is set at the extreme BOTTOM (CH 0, block 0) and the bottom is set at the extreme top (CH 7, block A). As the first scan is delivered from the N/S, the JPEG compression path hardware compares each pixel to a given "border" threshold value. Pixels "whiter" than the threshold are considered part of the check image, while pixels "darker" than the threshold are considered track background. Every time 5 consecutive image pixels are seen, the hardware declares a "transition". The first transition seen in a scan is considered the "bottom" of that scan while the last transition in a scan is considered to be the "top". After each scan, the top and bottom borders of the latest scan are sent to a Top and Bottom Port. Only if the latest scan's top border is "higher" than the value presently existing in the Top port will the Top port be updated to the new value. Likewise, only if the latest scan's bottom border is "lower" than the value presently existing in the Bottom port will the Bottom port be updated. The net result is that, after the entire image has been input, the Top port will contain the channel and block number of the "highest" point of the image and the Bottom port will contain the channel and block number of the "lowest" point of the image.

The reason the hardware requires five (5) CONSECUTIVE image pixels before declaring a transition is to prevent the top/bottom circuitry from erroneously declaring a border based on dust or scrap (noise) in the track that might exceed the value of the selected threshold for a few consecutive pixels. Selection of five has been determined experimentally.

Although, this concept of border detection may seem straight-forward, it is complicated by the fact that the vertical scans are not delivered to the H/C by a single pixel stream sequentially from the bottom to the top of the scan. Rather, data is delivered simultaneously from two pixel streams representing data from odd/even channels (0, 2, 4 and 6 and channels 1, 3, 5 and 7), respectively. To find a border of a single scan based on two interleaved streams of pixels, the hardware implements two independent transition detectors TD-1, TD-2 (one for each N/S pixel stream; see FIG. 7; FIG. 7 illustrates top/bottom detection from two serial pixel streams). When transitions are detected, the hardware considers which of the two detectors found the transition, the value of the Channel Counter and the value of the Vertical Block Counter (see the Transpose and Block description) to see where, in the scan, the transition took place. Based on this information, the appropriate Top or Bottom port can be updated.

Width Detection

The top and bottom borders are detected by the JPEG processing/compression path hardware, but the right (leading) edge and left (trailing) edge are detected upstream by the N/S hardware. The N/S hardware, subsequently, only "qualifies" the data between the lead and trail edges when it delivers pixel data to the JPEG processing/compression (P/C) paths. The N/S hardware will only qualify data in groups of 8 vertical scans. In other words, the N/S hardware frames the image in the horizontal dimension on block boundaries. Therefore, the only action the JPEG processing/compression hardware need perform to detect the width of the image (in block units) is to count every eighth qualified scan from the N/S unit. By doing this, the JPEG processing/compression hardware is able to furnish the horizontal dimension of the image to the DSP as soon as the image is input from the N/S.

Status Capture

When the N/S hardware sends image data to the JPEG P/C path, it appends a burst of image-related "status" information on the "back porch" of the image transfer. The JPEG P/C path must take this information, supplement it with "status data" pertinent to the P/C hardware and attach it to the now Compressed Image Packet that is to be sent to the rest of the check imaging system via the JCDB (output of FIG. 3).

The JPEG P/C hardware accomplishes this function by buffering the "status data" as it is received from the N/S (buffered at 3-9 FIG. 3), and then making this data available to the DSP for inclusion in the final Compressed Image Packet.

Remap (See 3 13, FIG. 3)

The normalized and scaled image received from the N/S unit, and stored in Input Buffer 3-1 (FIG. 3), is processed prior to compression. As stated earlier, the image processing algorithms are executed by the DSP, based on the image dimensions and histogram generated by the hardware as the image was being input from the N/S. Once the algorithms are executed, the image could be updated by having the DSP update every pixel in the Input Buffer to its new image processed value. Such a method would take a relatively long time, since the DSP would have to fetch, update and write every pixel in the Input Buffer.

A much faster method is preferred: i.e., to remap pixels "on the fly" as they are sequentially sent to the compression hardware. To implement this method, the DSP generates a 128-entry "remap table" (one for every pixel grey level). During compression, every pixel (7 bits) pulled from the Input Buffer addresses the 128 entry table (implemented in high speed RAM at 3-13) and the output from the table is the remapped, image processed value (8 bits) for that pixel. This "remapped pixel" (value) is then sent to the compression hardware (i.e., to 3-17, and beyond).

LSI JPEG Compression (see 3-17, FIG. 3)

The JPEG defined Discrete Cosine Transform (DCT), quantization and Huffman coding is implemented in a two-chip set from LSI LOGIC CORPORATION. This chip set requires that image pixels be delivered in 8×8 blocks. The retrieval of image data from Input Buffer 3-1 in the proper (8×8) sequence is effected by the Transpose and Block logic 3-11. The pixels are remapped (image processed) "on the fly" (at unit 3-13) before being sent to the LSI chip set (i.e. to block 3-17).

Because of the performance requirements of the high speed check imaging system, it is important to be able to compress the video image in Input Buffer 3-1 to a known packet size in a determinate amount of time. The image will be compressed once with the LSI chip set, using a standard QM and Huffman table provided by the DSP. Then, the result of this first compression, along with the image dimensions, will be used by the DSP to select a second QM and Huffman table which is then sent to the LSI chip set by the DSP. With this second QM and Huffman Table, this image (bit set) is then compressed a second time, then passed through Post Process unit 3-19 and stored in Output Buffer 3-25. This "dual compression" technique is a feature hereof, and will be understood to yield the desired compression packet size.

The design of the chip set by LSI LOGIC Corp. is such that the time required to compress an image can be determined by the amount of pixels to be compressed, as well as by the speed at which compression is executed. Even in the (statistically rare) case where JPEG compression results in EXPANSION, the LSI JPEG chip set will take no longer to execute. This feature is critical to performance in a high speed check imaging system like the indicated DP1800. To further increase compression speed and reduce the time a JPEG compression path requires to process an image, the operating clock frequency of the JPEG compression path is preferably increased from 20 MHz to 25 MHz during compression.

Packet Count (see 3-21, FIG. 3)

The JPEG P/C hardware need not save the results of "first pass compression". Therefore, many of the functions executed by Post Processor Unit 3-19 (e.g., byte stuffing, restart code insertion, writing to Output Buffer) are not done during "first pass compression". What is needed from first pass compression is merely an estimate of the result it yields. To provide this, the (32-bit) words output from the LSI LOGIC chip set 3-17 during compression are counted by the Packet Counter 3-21. The only inaccuracy in this count is that it does not include any "extra data" like stuffed bytes, restart codes or padded bytes that would be added to the compressed image by the Post Processor 3-19 (see FIG. 3). This extra data, however, is relatively insignificant, even for the most compressible images.

After "first pass compression", the DSP reads the Packet Counter and uses this "word-count" information to pick a Huffman Table and a QM for the "second compression."

JPEG Post Processor (See 3-19 and 3-17A FIG. 3)

The LSI JPEG chip set outputs 32-bit words of "entropy coded data" during compression. This data does not include the JPEG required "stuffed bytes" (a byte of 0x00 must follow every byte of 0xFF entropy coded data), or the JPEG required "restart codes" (two bytes of 0xFF and 0xDy after each horizontal row of blocks has been compressed) or the "padding bytes" (0xFF) required by the application to align restart codes on 32-bit boundaries.

The JPEG compression hardware must take the 32-bit output from the LSI chip set, insert the necessary data described above and funnel this information down into the 16-bit-wide Output Buffer 3-25. To accomplish this, the JPEG Post Processor 3-19, must take one byte at a time from the 32-bit LSI chip set output, check to see if the byte equals 0xFF, send this data to the Output Buffer - - - and also send another byte of 0x00 if the previous byte was 0xFF. After compressing each horizontal row of blocks, the Post Processor will insert the two-byte restart marker and the number of padding bytes required to align restart markers on 32-bit boundaries. JPEG standards require the restart marker to have a MOD 8 count component; and this is provided by the Post Processor hardware.

On average, it takes one clock cycle for the Post Processor to process each byte of data from the 32-bit (4 byte) LSI chip set . . . two clock cycles if a 0x00 byte needs to be stuffed. While compressing "busy" portions of the image, it is possible (worst case) for the LSI chip set to output a 32-bit word 3 times for every four clocks. The Post Processor cannot keep pace with the LSI chip set during these "busy" portions of the image. To mitigate such "special circumstances", the JPEG compression hardware preferably also provides a 1K×32 FIFO buffer 3-17A between the LSI chip set output and the Post Processor Logic (i.e., between 3-17 and 3-19). This buffer 3-17A allows the LSI output data to be buffered, and not lost, while the Post Processor catches up during "un-busy" portions of the image. Since the Post Processor only operates during "second pass compression" (when the DSP has already selected a target QM, and when compression is more predictable), the probability of "busy" portions of image occurring is greatly reduced. Therefore, any FIFO buffer, let alone a 1K FIFO, would rarely be used. In the statistically-rare case where the FIFO (3-17A) is being heavily used, the input to the LSI chip set will be throttled by the JPEG compression hardware when the FIFO (3-17A) reaches "half-full" (512 words waiting for Post processing). Although this feature will rarely be used, it prevents data from being lost, even in the most extreme case. In fact, images would have to EXPAND by a factor of 4 before this feature would ever kick-in. The only side effect of executing this feature is a slight increase in compression time due to the occasional "throttling" of the input to the LSI chip set (in 3-17).

Restart Marker FIFO (3-23, FIG. 3)

During "second pass compression", the JPEG P/C hardware generates and loads the compressed (entropy-coded) data into Output Buffer 3-25. After second pass compression is complete, the DSP builds the required header information around the entropy coded data packet. One of the required elements of the header is a table of offsets that will point to the END of each entropy coded segment in the Output Buffer. An entropy coded segment from the JPEG P/C hardware is comprised of the compressed data from one horizontal row of 8×8 blocks, ending with a restart marker. Providing this table allows the compressed image to be "gracefully" truncated by software on entropy coded segment boundaries.

The DSP gets this "offset" information from the Restart Marker FIFO 3-23. During second pass compression, the Post Processor 3-19 must insert restart markers into the Output Buffer at the end of each entropy coded segment. When the Post Processor loads a restart marker into the Output Buffer, the address into the Output Buffer at that particular instant is loaded into the Restart Marker FIFO.

Output Buffer (3-25, FIG. 3)

The 64K×16 Output Buffer 3-25 is the physical location where the Compressed Image Packet is built by the JPEG compression hardware (entropy coded data) and by the DSP (header information). During second pass compression the entropy coded data is loaded into the Output Buffer. After second pass compression is complete, the DSP builds the remaining header information around the entropy coded data. Once this is complete, the Image Packet is ready for transfer to the next stage (see JCDB, or "JPEG compressed Data Buffer, FIG. 3) of the high speed check imaging system; and then the JPEG compression path is free to accept another image into its Input Buffer 3-1.

This "dual buffering" (Input Buffer and Output Buffer) so implemented in my JPEG processing/compression path according to this feature, enhances performance by allowing a second image to be received by a JPEG compression path before the first Compressed Image Packet is sent to the JCDB.

Reprise

In summary, it will be understood that this invention provides, among other features, a digital data processing/ compression arrangement, especially for video (image) data bits representing a document—presented in serial stream— especially using a pre-processing buffer stage for presenting the data in two parallel bit-streams, with two parallel like compression paths, especially where "two-stage" compression is used, doing so in "real time" and, preferably to JPEG standards - - - more especially using a single two-pass PC board.

While the above describes how to make and use certain invention embodiments, various alternative constructions and techniques may be employed without departing from the true spirit and scope of the invention as here claimed.

Workers will appreciate how aptly such a dual, two-path, two-stage compression arrangement is more effective for real-time processing.

It will be understood that the preferred embodiments described herein are only exemplary, and that the invention is capable of many modifications and variations in construction, arrangement and use without departing from the spirit of this invention.

Further modifications of the invention are also possible. For example, the means and methods disclosed herein are also applicable for compressing other serial bit-sets.

The above examples of possible variations of the present invention are merely illustrative. While variations in these various embodiments may not, each, yield all the mentioned advantages, certain features may loom more important than others depending on the application. Accordingly, this invention is to be considered as including all possible modifications and variations coming within the scope of the appended claims, and to be limited only by these claims.

What is claimed is:

1. In a system for processing and imaging documents to develop a stream of digital, video bit sets, each related to a different document in a passing array, this system including an arrangement for simultaneously compressing a number of said bit-sets for different document images and sending the results to output means, this arrangement also comprising:

edge-detect means for combinatorially determining the top and bottom location of document images, plus the width thereof;

a preprocessing stage for distributing each said bit set in a pair of like parallel bit-compression paths, one, a Master path for half the bits in a set, the other a Slave path for the other half of the bits in a set, as controlled by said Master all input to a common buffer means, each said compression path being adapted to execute a prescribed first compression and then a prescribed conditional second compression when prescribed initial factors are indicated and provide a prescribed real-time-compressed output to said buffer means;

both said compressions being performed on a single two-pass stage of a Histogram/Compressor printed circuit board.

2. A system for processing and imaging items to develop a stream of digital, video bit sets, each related to a different item in a passing array, this system including an arrangement for simultaneously compressing a number of said bit-sets for different document images and sending the results to output means, this arrangement also comprising:

a preprocessing stage for distributing each said bit set in a pair of like parallel bit-compression paths, one, a Master compression path for half the bits in a set, the other a Slave compression path for the other half of the bits in a set, as controlled by said Master all input to a common buffer means, each said compression path being adapted to execute a prescribed first compression and then a prescribed conditional second compression when prescribed initial factors are indicated and provide a prescribed real-time-compressed output to said buffer means.

3. A system for processing and imaging checks and like documents to develop a stream of digital, video bit sets, each set related to a different item in a passing array, this system including an arrangement for simultaneously compressing a number of said bit-sets for different document images and sending the results to output means, this arrangement also comprising:

a preprocessing stage for distributing each said bit set in a pair of like parallel bit-compression paths, one, a Master compression path for half the bits in a set, the other a Slave compression path for the other half of the bits in a set, as controlled by said Master all input to a common buffer means, each said compression path being adapted to execute a prescribed first compression and then a prescribed conditional second compression, but only when prescribed initial factors are indicated, to this provide a prescribed real-time compressed output to said buffer means; and thence to said output means.

* * * * *